United States Patent Office 3,216,802
Patented Nov. 9, 1965

3,216,802
METHOD AND REAGENT FOR DETERMINING MOISTURE CONTENT OF PAPER
Charles J. Smith, Jr., Charleston, S.C., assignor to West Virginia Pulp and Paper Company, New York, N.Y., a corporation of Delaware
No Drawing. Filed Jan. 24, 1962, Ser. No. 168,550
5 Claims. (Cl. 23—230)

This invention relates to a method of determining the moisture content of paper and similar fibrous web materials and to a chemical composition for use in such method.

It is the object of this invention to provide a fairly rapid, inexpensive, easily employed method of determining the moisture content of paper and similar fibrous webs.

I have found that when a solution of cobaltous chloride ($CoCl_2 \cdot 6H_2O$) in an essentially non aqueous volatile solvent is placed in contact with a fibrous web and the solvent allowed to evaporate that the residue of cobaltous chloride remaining on the fibrous web will undergo a color change which is directly related to the moisture content of the paper. By determining the colors obtained by this process for samples of paper of various predetermined moisture content, a standard color chart can be prepared. By repeating the process on samples of unknown moisture content and comparing the color obtained with that of the standard color chart the moisture content of the unknown sample can easily be determined. The accuracy of this method is about ±1% moisture content which is quite adequate for most moisture determinations in the paper field. This accuracy applies generally only to the range from about 3 to 11% moisture content. Outside of these limits insufficient variance of color is obtained to provide an estimate of moisture content with any degree of accuracy.

The cobaltous chloride solution when employed with very dry paper, less than about 2% moisture, a blue coloration is obtained. As the moisture content of the paper increases the coloration of the residue gradually becomes lighter and redder until at a moisture content of about 12% a pale rose or red color is obtained which does not change further at higher moisture contents. Since the red coloration change over the range of 5 to 12% can become obscured by the normal color of certain types of paper, such as unbleached kraft, which are naturally highly colored, it is greatly preferred that a dye be incorporated into the indicator solution to give more vivid coloration. These dyes should be in the yellow through red range to provide a vivid contrast with the blue coloration of dry cobaltous chloride when it is dry. With such dyes very observable color changes from green, purple or blue at dry moisture contents to red, yellow, or orange at high moisture contents can be obtained. The major requirement for these dyes other than their color is that they must be sufficiently soluble in the volative solvent to give a definite coloration to the paper when the solvent is evaporated. The extract degree of solubility cannot be definitely set forth as this depends greatly upon the vividness and depth of the individual dye being employed.

Generally the dyes to be employed will be of the water soluble type. These water soluble dyes are soluble to a sufficient extent in the volatile solvents which must necessarily be employed to provide a residue of adequate depth of color upon evaporation of the solvent.

While a number of solvents can be employed these solvents must possess certain characteristics. First, they must be a sufficiently good solvent for the cobaltous chloride that an appreciable quantity of the cobaltous chloride will be left as a residue to give adequate coloration. It has been found that solubility to the extent of at least 4 parts by weight of cobaltous chloride to 10 parts by weight of solvent is necessary for this purpose. It is preferred, however, that the solvent have higher solubility for the cobaltous chloride, on the order of 7 parts of cobaltous chloride per 10 parts of solvent.

The solvent must also be sufficiently volatile under ambient conditions that it will be evaporated within a reasonable period of time, i.e., less than about 10 to 15 minutes. Evaporation of the solvent should not be too rapid, however, as this causes cooling at the test location. Such cooling apparently raises the relative humidity of the air surrounding the test site as the results obtained indicate higher moisture contents than are actually present. For this reason it is preferable that the volatilization of the solvent occur over a period of at least two minutes.

The solvents which have been found to be most usable are methanol, ethanol, and acetone and combinations thereof. Ethanol, while having the greatest solubility for the cobaltous chloride, has the lowest volatility of these three solvents. Conversely, acetone has the lowest solubility and the greatest volatility. It is consequently the most preferred practice to employ methanol as the solvent as it reaches a compromise between these characteristics. As has been stated hereinabove, these solvents must be essentially anhydrous. While it is generally impracticable to eliminate all water from these solvents the quantity of water in the solvent should be less than about 1% of the cobaltous chloride (calculated on the basis of the hydrate) to be employed in the solution. To achieve the best results the quantity of water should be even less, on the order of 0.3% of weight of the cobaltous chloride.

The practice of this invention may be easily seen in the following example.

*Example*

A quantity of methanol (99.85%) was saturated at room temperature with Biebrich Scarlet Water Soluble Certified Stain. 555 grams of cobaltous chloride hydrate ($CoCl_2 \cdot 6H_2O$) were added to 1000 ml. of the saturated dye solution. The resultant mixture was agitated until all the cobaltous chloride went into solution.

One drop of this solution was applied to each of a number of samples of kraft paper whose moisture content had been adjusted to specific levels. The moisture contents of these samples were: oven-dry, 3%, 5%, 7%, 9%, 11%, and 13%. The methanol was permitted to volatilize and the color of the cobaltous chloride-dye residue remaining carefully recorded in permanent casein water color paints.

A drop of the indicator solution was applied to a set of paper samples having unknown moisture contents. The color of the residue remaining after the solvent had volatilized was observed and compared to the colors recorded for the above samples of known moisture content. The moisture content of these same samples was checked by oven drying of the samples. Comparison of the values obtained by the two methods are shown in the following table indicating the general accuracy of my method.

| Indicator Solution Moisture Content, Percent | Oven Drying Moisture Content, Percent |
|---|---|
| 8–9 | 8.7 |
| 3–4 | 3.4 |
| 6–7 | 6.2 |
| 8–9 | 8.2 |

Numerous other comparisons of actual moisture content with that obtained by the use of the indicator solution confirm the degree of accuracy shown in the above table.

Generally about 2 to 10 minutes will be required to conduct a moisture determination. This wide variance in time is due primarily to the variation in the volatility of the solvent and the ambient atmospheric conditions existing at the time of testing as temperature, humidity, and other factors exert some influence on the rate of solvent evaporation. Humidity in the atmosphere may also influence the results obtained since the cobaltous chloride may absorb moisture from the air under condition of high relative humidity. Consequently for best results the sample being tested should be covered with another sheet of paper or other material after application of the indicator solution. While this procedure generally increases the time required to conduct the test due to its interfering with the volatilization of the solvent, such procedure is highly desirable where the paper is not at equilibrium moisture conditions with the surrounding atmosphere such as a paper sample from the interior of a tightly wound roll of paper.

The method of testing the moisture content of fibrous webs described herein offers several definite advantages over methods which have been previously employed. It is first very inexpensive, costing a small fraction of a cent to make a moisture determination and requiring no large initial investment for expensive ovens or electrical resistance measuring devices as required by the currently commonly employed methods. Secondly, it is extremely adaptable to use with many types of cellulose fiber webs, such as paper both bleached and unbleached, matted bagasse, and woven cotton, and to use under wide ranges of ambient conditions of humidity and temperature. Unlike electrical resistance methods, wide variations in temperature have little effect on the accuracy of the results. Thirdly, the use of this method provides for great versatility. For example by a single application of indicator solution to a piece of paper, the moisture content of the paper throughout the conversion of the paper into an end product can be continuously monitored by a simple color comparison. In such cases the moisture determination is essentially instantaneous and does not require interruption of the conversion process for the removal of a sample. This method consequently may be employed either for spot determination of moisture content or for continuous determination throughout the life of the paper.

I claim:

1. The method of determining the moisture content of fibrous webs which comprises contacting the fibrous web with an essentially anhydrous solution of cobaltous chloride and a dye of a yellow to red coloration in a volatile solvent selected from the group consisting of methanol, ethanol, acetone, and mixtures thereof, effecting evaporation of the solvent from the fibrous web to leave a non-volatile residue containing the cobaltous chloride, observing the color of the residue remaining on the fibrous web, and comparing the color observed against a standard color chart indicating the color obtained employing a similar solution on fibrous webs of known moisture content.

2. An indicator solution for determining the moisture content of fibrous webs which comprises an essentially anhydrous solution of cobaltous chloride, and a dye imparting a color of the yellow-orange-red hues in a volatile solvent selected from the group consisting of methanol, acetone, ethanol and mixtures thereof.

3. The indicator solution of claim 2 wherein the solvent is methanol.

4. The indicator solution of claim 2 wherein the solvent is acetone.

5. The indicator solution of claim 2 wherein the solvent is ethanol.

References Cited by the Examiner
UNITED STATES PATENTS

| | | | |
|---|---|---|---|
| 650,149 | 5/00 | Howard | 73—335 |
| 2,460,068 | 1/49 | Davis | 252—408 |
| 2,460,073 | 1/49 | Davis | 252—408 |
| 2,761,312 | 9/56 | Line et al. | 23—230 |
| 2,950,958 | 8/60 | Nesh | 23—230 |

MORRIS O. WOLK, *Primary Examiner.*

ANTHONY SCIAMANNA, *Examiner.*